United States Patent [19]

Eddy et al.

[11] Patent Number: 5,017,432
[45] Date of Patent: May 21, 1991

[54] FUSER MEMBER

[75] Inventors: Clifford O. Eddy, Webster; Arnold W. Henry, Pittsford; Lynn Lorenzo, Penfield; Che C. Chow, Penfield; Robert M. Ferguson, Penfield; Robert N. Finsterwalder, Webster, all of N.Y.

[73] Assignee: Xerox Corporation, Stamford, Conn.

[21] Appl. No.: 405,392

[22] Filed: Sep. 11, 1989

Related U.S. Application Data

[63] Continuation of Ser. No. 166,577, Mar. 10, 1988, abandoned.

[51] Int. Cl.[5] .......................... B32B 27/08; B32B 15/08
[52] U.S. Cl. .................................. 428/422; 428/463; 428/906; 430/99; 430/104
[58] Field of Search ............... 428/418, 421, 422, 906, 428/463; 430/98, 99, 106.6; 355/284; 427/22

[56] References Cited

U.S. PATENT DOCUMENTS

| | | | |
|---|---|---|---|
| 3,937,637 | 2/1976 | Moser et al. | 430/99 |
| 4,029,827 | 6/1977 | Imperial et al. | 427/22 |
| 4,101,686 | 7/1978 | Strella et al. | 427/22 |
| 4,185,140 | 1/1980 | Strella et al. | 428/418 |
| 4,257,699 | 3/1981 | Lentz | 355/284 |
| 4,264,181 | 4/1981 | Lentz et al. | 355/284 |
| 4,272,179 | 6/1981 | Seanor | 430/98 X |
| 4,560,635 | 12/1985 | Hoffend et al. | 430/106.6 |

OTHER PUBLICATIONS

Viton Curative, No. 50, Bulletin by E. I. Du Pont de Nemours & Company (Inc.), Sep. 1986.

"Monomers, Fluorine Level Affect Fluoroelastomer Usage", by M. M. Lynn, 3M Company, published in *Rubber Plastic News,* dated Jul. 27, 1987, pp. 18–22.

*Primary Examiner*—Thomas J. Herbert

[57] ABSTRACT

A fuser member and fuser system of a type wherein a polymeric release agent having functional groups supplied to the surface of the fuser member has an elastomer fusing surface comprising poly(vinylidenefluoride-hexafluoropropylene-tetrafluoroethylene) wherein the vinylidenefluoride is present in the amount less than 40 mole percent, a metal oxide is present in amounts sufficient to interact with the polymer release agent having functional groups to provide an interfacial barrier layer between the fusing surface and the toner and being substantially unreactive with the elastomer and wherein the elastomer is cured from a solvent solution thereof with a nucleophilic curing agent soluble in the solution and in the presence of less than 4 parts by weight of inorganic base per 100 parts by weight of polymer with the inorganic base being effective to at least partially dehydrofluorinate the vinylidenefluoride.

9 Claims, 1 Drawing Sheet

FUSER MEMBER

This is a continuation of application Ser. No. 07/166,577, filed Mar. 10, 1988 now abandoned.

The present invention relates to a fuser member and a method for fusing toner images in electrostatographic reproducing apparatus. In particular, it relates to a long life fuser member for use with a polymeric release agent having functional groups.

BACKGROUND OF THE INVENTION

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well know. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 160° C. or higher depending upon the softening range of the particular resin used in the toner. It is undesirable, however, to raise the temperature of the substrate substantially higher than about 200° C. because of the tendency of the substrate to discolor at such at elevated temperatures particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip effects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The so called "hot offset" occurs when the temperature of the toner is raised to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To insure and maintain good release properties of the fuser roll, it has become customary to apply release agents to the fuser members to insure that the toner is completely released from the fuser roll during the fusing operation. Typically, these materials are applied as thin films of, for example, silicone oils to prevent toner offset.

PRIOR ART

Some recent developments in fuser members, release agents and fusing systems are described in U.S. Pat. No. 4,264,181 to Lentz et al., U.S. Pat. No. 4,257,699 to Lentz and U.S. Pat. No. 4,272,179 to Seanor, all commonly assigned to the assignee of the present application. These patents describe fuser members and methods of fusing thermoplastic resin toner images to a substrate wherein a polymeric release agent having functional groups is applied to the surface of the fuser member. The fuser member comprises a base member having an elastomeric surface with a metal containing filler therein which has been cured with a nucleophilic addition curing agent. Exemplary of such fuser member is an aluminum base member with a poly(vinylidenefluoride-hexafluoropropylene) copolymer cured with bisphenol curing agent having lead oxide filler dispersed therein and utilizing a mercapto functional polyorganosiloxane oil as a release agent. In those fusing processes, the polymeric release agents have functional groups (also designated as chemically reactive functional groups) which interact with the metal containing filler dispersed in the elastomer or resinous material of the fuser member surface to form a thermally stable film which releases thermoplastic resin toner and which prevents the thermoplastic resin toner from contacting the elastomer material itself. The metal oxide, metal salt, metal alloy or other suitable metal compound filler dispersed in the elastomer or resin upon the fuser member surface interacts with the functional groups of the polymeric release agent. Preferably, the metal containing filler materials do not cause degradation of or have any adverse effect upon the polymeric release agent having functional groups. Because of this reaction between the elastomer having a metal containing filler and the polymeric release agent having functional groups, excellent release and the production of high quality copies are obtained even at high rates of speed of electrostatographic reproducing machines.

While the mechanism involved is not completely understood, it has been observed that when certain polymeric fluids having functional groups are applied to the surface of a fusing member having an elastomer surface with a metal oxide, metal salt, metal, metal alloy or other suitable metal compounds dispersed therein there is an interaction (a chemical reaction, coordination complex, hydrogen bonding or other mechanism) between the metal of the filler in the elastomer and the polymeric fluid having functional groups so that the polymeric release agent having functional groups in the form of a liquid or fluid provides an excellent surface for release which having an excellent propensity to remain upon the surface of the fuser member. Regardless of the mechanism, there appears to be the formation of a film upon the elastomer surface which differs from the composition of the elastomer and the composition of the polymeric release agent having functional groups. This film, however, has a greater affinity for the elastomer containing a metal compound than the toner and thereby provides an excellent release coating upon the elastomer surface. The release coating has a cohesive force which is less than the adhesive forces between heated toner and the substrate to which it is applied and the cohesive forces of the toner. The interaction between the functional group of the polymeric release agent and the metal of the elastomer containing metal leads to an overall diminution of the critical or high surface energy of the metal in the metal containing filler.

The preferred elastomers are the fluoroelastomers and the most preferred fluoroelastomers are the vinylidenefluoride based fluoroelastomers which contain hexafluropropylene and tetrafluoroethylene as comonomers Two of the most preferred fluroelastomers are (1) a class of copolymers of vinylidenefluoride and hexafluoroproplyene known commercially as Viton A (2) a class of terpolymers of vinylidenefluoride, hexafluoropropylene and tetrafluoroethylene known commercially as Viton B. Viton A and Viton B and other Viton designations are trademarks of E. I. DuPont deNemours and Company. Other commercially available materials include Fluorel of 3M Company, Viton GH, Viton E 60C, Viton B 910, and Viton E 430. The preferred curing system is a nucleophilic system with a bisphenol crosslinking agent to generate a covalently cross-linked network polymer formed by the application of heat following basic dehydrofluorination of the copolymer. The nucleophilic curing system also includes an organophosphonium salt accelerator. Some of the commercially available fluoroelastomer polymers which can be cured with the nucleophilic system are Viton E 60C, Viton B 910, Viton E 430, Viton A, Viton B. Example 4 of both U.S. Pat. Nos. 4,264,181 and 4,272,179 exemplify Viton B, an elastomer of poly(-vinylidenefluoride-hexafluoropropylene-tetrafluoroethylene) with copper particles exhibiting excellent release of the thermoplastic resin toner when used with the mercapto functional polyorganosiloxane oil release agent. Example 3 in U.S. Pat. No. 4,257,699 has similar results with a bisphenol cure system. Unsatisfactory fusing results were achieved in Example 7 of U.S. Pat. No. 4,264,181 and 4,272,179 as well as Example 6 of U.S. Pat. No. 4,257,699 wherein Viton GH a terpolymer of poly(vinylidenefluoride-hexafluropropylene-tetrafluoroethylene) having a copolymerized cure site monomer and containing trace amounts of metal containing filler was cured with an aliphatic peroxide curing agent. Example 12 in U.S. Pat. No. 4,272,179 and 13 in U.S. Pat. No. 4,257,699 illustrate a similar fuser roll also cured with a conventional aliphatic peroxide curing agent and containing substantial quantities of lead oxide.

The use of polymeric release agents having functional groups which interact with a fuser member to form a thermally stable, renewable self-cleaning layer having superior release properties for electroscopic thermal plastic resin toners is described in U.S. Pat. Nos. 4,029,827 to Imperial et al., 4,101,686 to Strella et al. and 4,185,140 also to Strella et al. all commonly assigned to the assignee of the present invention. In particular, U.S. Pat. No. 4,029,827 is directed to the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether, and mercapto groups as release fluids. Some of these fusing systems have enjoyed significant commercial application. For example, a fuser roll made from Viton E 45 (a copolymer of 77 mole percent vinylidenefluoride and 23 mole percent hexafluoropropylene) filled with lead oxide has been successfully used in a fusing system employing a mercapto functional polyorganosiloxane release agent.

While these materials have been used successfully in several commercial applications they nevertheless exhibit difficulties in certain applications. For example, and with reference to the previously described fuser roll made from Viton E 45 and lead oxide and used with a mercapto functional polyorganosiloxane, the release agent is normally applied at a rate of about 8 microliters per 8-½"×11" copy. For some applications, this may result in an excessive quantity of oil being placed on the copy sheet in that subsequent typing on the sheet may be difficult since the individual characters do not stick to the copy sheet. In addition, there is generally a desire to reduce the quantity of release agent present on the copy sheet simply as means of overall reducing per copy cost. Furthermore, while the lead oxide filler in the fuser roll does indeed function as an anchoring site for the functional release agent and forms therewith an interfacial layer it is also a strong base and functions as a curing agent for the elastomer. With continued aging, the lead oxide may react with the Viton increasing the crosslink density resulting in a harder fuser roll producing a glossy image. Furthermore, while nucleophilic curing has been used with fluoroelastomers, some of the fluoroelastomers are normally peroxide cured. However, such a curing system is very difficult to use where the fuser member is prepared from solvent solution of the elastomer which is sprayed onto a substrate and coated thereon. The difficulties reside in obtaining an oxygen-free atmosphere since otherwise the oxygen reacts with the peroxide in preference to the peroxide reacting with the fluoroelastomer thereby not curing properly and complete removal of solvent to avoid chain transfer reactions that inhibit crosslinking. As a result, it is preferred to use a nucleophilic curing system when the fuser member is made by spraying a solvent solution of the elastomer. Normally, however, such nucleophilic curing systems employ relatively high amounts of inorganic base which functions to dehydroflourinate the vinylidenefluoride portion of the molecule forming double bonds which provide reactive sites for subsequent crosslinking. As a result, excess base will continue to react with the fluoroelastomer after the initial dehydrofluorination and degrade the fluoroelastomer by creating additional double bonds which oxidize thereby increasing the surface energy and reducing the release characteristics.

Furthermore, many toner compositions include a small amount of a charge enhancing additive to more effectively impart the desired charge to the toner resin particles. A particularly effective charge enhancing additive is distearyl dimethyl ammonium methyl sulfate (DDAMS) as described in U.S. Pat. No. 4,560,635 to Hoffend et al. When toners containing such charge enhancing additives are used in fusing systems with fluoroelastomers as described above, we have found that the basic nature of the charge enhancing additive results in formation of double bonds in the fluoroelastomer which can produce hardening of the fuser member and subsequent oxidation produces increased surface energy of the fuser member and the irregular wearing of the fuser surface.

SUMMARY OF THE INVENTION

We have found a unique combination of fluoroelastomer, metal oxide and curative system which overcomes or at least minimizes the above deficiencies. In particular, we have found that an effective long life fuser member to be provided with a fusing surface comprising poly(vinylideneflouride-hexafluoropropylene-tetra-fluoroetheylene) where the vinylidene fluoride is present in an amount less than 40 mole percent, a metal oxide present in an amount sufficient to interact with the polymeric release agent having functional groups to provide an interfacial barrier layer between the fusing surface and the substrate and being substantially unreactive with the elastomer which is cured from a dried solvent solution thereof with a nucleophilic curing agent soluble in the solvent solution and in the presence of less than four parts by weight of inorganic base, per hundred parts of polymer, the inorganic base being effective to at least partially dehydrofluorinate the vinylidenefluoride.

In a specific aspect of the present invention the nucleophilic curing agent is a bisphenol crosslinking agent and an organo phosphonium salt accelerator.

In a further aspect of the present invention, the metal oxide is cupric oxide.

In a further aspect of the present invention, the elastomer contains a copolymerized cure site monomer.

In a further aspect of the present invention, the base member is cylindrical and the elastomer fusing surface is a cylindrical outer layer on the base member forming a roll.

In a further aspect of the present invention the fuser member is used with a toner which contains distreayl dimethyl ammonium methyl sulfate as a charge enhancing additive.

In a further aspect of the present invention, the polymeric release agent having functional groups is a polyorganosiloxane containing mercapto functional groups.

In a further aspect of the present invention, the on copy substrates contain less than about 4 microliters of release agent per 8-½"×11" substrate.

DETAILED DESCRIPTION OF THE PRESENT INVENTION

Figure 1:
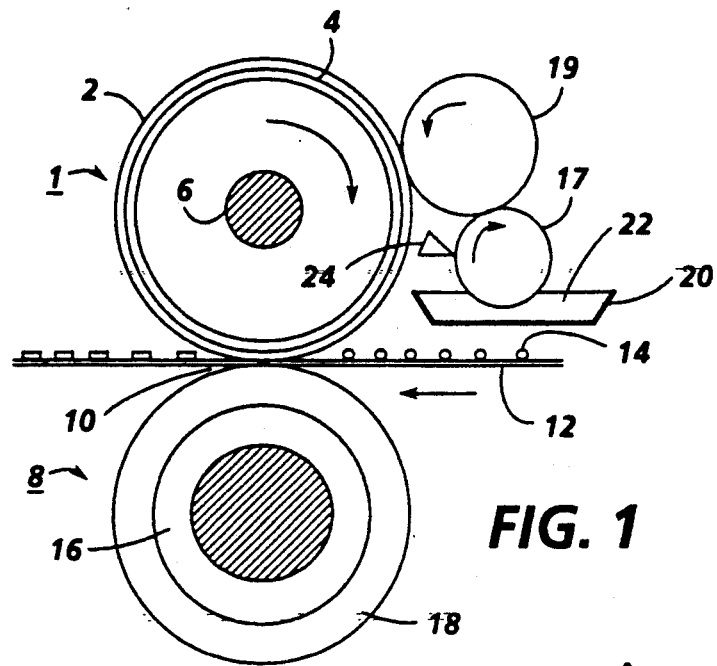
FIG. 1 is a sectional view of a fuser system which may use the fuser roll of the present invention.

The fluoroelastomers previously used in prior art practices as fuser surfaces generally contain substantial quantities of the vinylidene fluoride monomer. For example, Viton E 45 contains 77 mole percent vinylidenefluouride and 23 mole percent hexafluoropropylene, the terpolymer Viton B 50 contains 61% vinylidenefluoride, 17% hexafluoropropylene and 22% tetrafluoroethylene. The presence of such substantial quantities of vinylidenefluoride provide abundant sites for dehydrofluorination and formation of double bonds. While a certain amount of dehydrofluorination is necessary for adequate crosslinking, the presence of vinylidenefluoride presents additional sites for subsequent attack by other strongly basic material such, as for example, the metal oxide filler used to form the interfacial layer with the polymeric release agent containing functional groups, the base used in the nucleophilic curing system and any basic additive that may be present in the toner. Such attacks result in the dehydrofluorination of the elastomer and the formation of double bonds which condense forming additional cross links leading to hardening of the elastomer surface and upon subsequent oxidation of residual double bonds catelyzed by the metal oxide filler increase the surface energy all of which are undesirable. In avoiding subsequent dehydrofluorination by basic materials, it would be desirable to have the elastomers as completely fluorinated as possible. On the other hand, if the monomers were completely fluorinated, it would be very difficult to form the necessary crosslinking. Thus, there must be a balance between the degree of flourination and the ability for crosslinking.

To further reduce the opportunity for dehydrofluorination by the metal containing filler we have selected a filler which is substantially unreactive with the elastomer and at the same time will interact sufficiently with the polymeric release agent to provide an interfacial barrier layer. Since we prefer to fabricate the fuser member by spraying from the solvent solution of the elastomer, we use a nucleophilic curing system to avoid the problems associated with free radical cure of the polymer, e.g. the elimination of solvent so radicals won't be wasted in chain transfer to solvent thus reducing cross link density or even yielding soluble polymer. However, in contrast to some other nucleophilic curing systems, we use a curing agent which is soluble in the solvent solution of the elastomer. By being soluble in the solvent solution, we insure that the crosslinking agent is in close proximity to the activated crosslinking sites. The nucleophilic curing system normally takes place in the presence of 8 to 10 parts by weight of base per 100 parts by weight of polymer. However, to minimize continued reaction between excess base and the cured elastomer through dehydrofluorination and the creation of double bonds which subsequently oxidize resulting in increased surface energy and decreased release performance we limit the amount of inorganic base to less than 4 parts by weight per 100 parts of polymer.

Accordingly, we herein provide a fusing member with a vinylidenefluoride content having a good balance between being as completely fluorinated as possible and still being able to adequately crosslink it for a fuser member, having a filler which is interactive with the functional release agent providing anchoring sites therefore but which is unreactive with the elastomer. In addition the elastomer which is more resistant to attack by basic materials, including DDAMS and can be sprayed from a nucleophilic curing system wherein the curing agent is soluble in a solvent solution of the elastomer thereby providing proximity of the curing agent to the activated crosslinking sites. Furthermore, the amount of inorganic base is controlled to generate active sites for crosslinking but not be present in amounts for sufficient substantial increase in surface energy.

This balance is provided by a fusing surface comprising poly(vinylidenefluoride-hexafluoropropylene-tetrafluoroethylene) wherein the vinylidenefluoride is present in an amount less than 40 mole percent, a metal oxide is present in an amount sufficient to interact with the polymeric release agent having functional groups to provide an interfacial barrier layer between the fusing surface and the substrate and which is substantially unreactive with the elastomer, the elastomer having been cured from a solvent solution thereof with a nucleophilic addition curing agent soluble in the solvent solution and in the presence of less than 4 parts by weight of inorganic base per 100 parts of polymer, the inorganic base being effective to at least partially dehydrofluorinate the vinylidenefluoride.

A typical fuser member of the present invention is described in conjunction with a fuser assembly as shown in FIG. 1 where the numeral 1 designates a fuser roll comprising elastomer surface 2 having metal oxide filler dispersed therein (not shown) upon suitable base member 4 which is a hollow cylinder or core fabricated from any suitable metal such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner images 14 thereon contact elastomer surface 2 of fuser roll 1. As shown in FIG. 1, the backup roll 8 has a rigid steel core 16 with an elastomer surface or layer 18 thereon. Sump 20 contains polymeric release agent 22 which has chemically reactive functional groups thereon which are capable of interacting with the metal oxide filler dispersed in elastomer surface 2. The polymeric release agent 22 having functional groups thereon, may be a solid or liquid at room temperature, but it is a fluid at operating temperatures. In a preferred embodiment, the chemically reactive groups of polymeric release material 22 in sump 20 are mercapto, carboxy, hydroxy, isocyanate, epoxy, and amino. The most preferred polymeric release agents having functional groups thereon used in accordance with the present invention are the mercapto-funtional polyorganosiloxanes.

In the embodiment shown in FIG. 1 for applying the polymeric release agent 22 to elastomer surface 2, two release agent delivery rolls 17 and 19 rotatably mounted in the direction indicated are provided to transport release agent 22 from the sump 20 to the elastomer surface. As illustrated in FIG. 1, roll 17 is partly immersed in the sump 20 and transports on its surface release agent from the sump to the delivery roll 19. By using a metering blade 24 a layer of polymeric release fluid can be applied initially to delivery roll 19 and subsequently to elastomer 2 in controlled thickness ranging from submicron thickness to thickness of several microns of release fluid. Thus, by metering device 24, about 0.1 to 2 microns or greater thicknesses of release fluid can be applied to the surface of elastomer 2.

Figure 2:
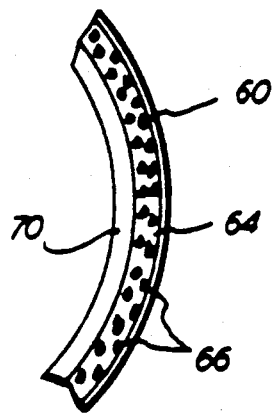
FIG. 2 is a fragmentary sectional view of one embodiment of the fuser member of the present invention.

Referring to FIG. 2, there is shown a fragmentary view of part of the fuser member of the present invention magnified many times in order to show the thin layers of the fuser member surface. In FIG. 2, the base member or other solid structure upon which the elastomer is applied is designated by numeral 70. Elastomer 64 is deposited upon base member 70 by any suitable means such as spraying elastomer 64 containing metal oxide filler 66 directly upon base member 70. The metal oxide filler particles 66 shown in FIG. 2 are illustrated as having irregular shapes, however, any form of metal oxide may be used in elastomer 64 including powders, flakes, platelets, spheroids, fibers, ovoid particles and the like. A film of polymeric release agent having functional groups is shown on the surface of elastomer 64 and is designated by numeral 60.

The thickness of the elastomer having metal-containing filler dispersed therein is not critical in the practice of the present invention. Generally, where the fuser member is heated by internal means, the elastomer having metal oxide filler therein is preferably of such thickness as to constitute a minimal thermal barrier to heat radiating from inside the fuser member to the outermost layer of elastomer having metal oxide filler therein. Recommended thicknesses are generally greater than 0.5 mil (0.00127 cm), but may be from 1 mil (0.0025 cm) to about 200 mils (0.5 cm), the most preferred ranges being from about 4 mils (0.01 cm) to about 100 mils (0.25 cm). The preferred thickness depends upon the fuser member configuration and the particular backup or pressure member (hard or conformable) being used with the fuser member.

Figure 3:
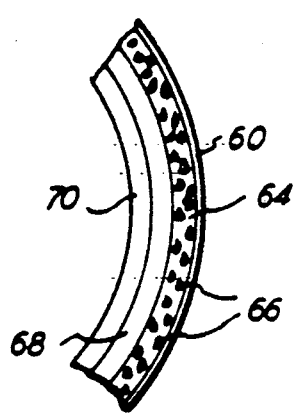
FIG. 3 is a fragmentary sectional view of another embodiment of the fuser member of the present invention.
Figure 4:
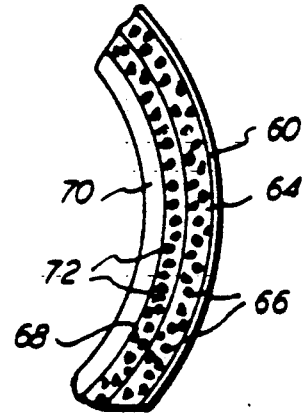
FIG. 4 is a fragmentary sectional view of another embodiment of the fuser member of the present invention.

FIGS. 3 and 4 show alternative fragmentary views of alternative embodiment of the fuser member wherein in an intermediate layer 68 is positioned between the base member 70 and the elastomer 64. As illustrated in FIG. 3, the intermediate layer may be unfilled with filler material and as illustrated in FIG. 4 the intermediate elastomer layer 68 maybe filled with metal oxide filler 72. The intermediate layers maybe deposited upon the base member 70 by any suitable method. The intermediate layers may be optionally used to promote strength and conformability or compressibility when used in conjunction with a backup or pressure roll.

The release agent may be applied by any suitable means. A sump and delivery roll arrangement is illustrated in the drawing, however, the polymeric release agent having functional groups may be applied by spraying from jets or other orifices, by padding from a flat, contoured or other shaped pad made of fabric, sponge, felt or other suitable material, by metering with an applicator roller or series of applicator rollers, or by means of a belt, by means of a solid bar or blade of the release agent material wiping against the fuser members, or by any other suitable applicator means or device. An applicator roll or applicator belt having an elastomer surface with metal oxide filler dispersed therein may also be used to apply the polymeric release agent having functional groups.

The elastomers which may be used in accordance with the present invention must be heat stabilized elastomer resin materials which can withstand elevated temperatures generally from about 90° C. to about 200° C. or higher depending upon the temperature desired for fusing or fixing the thermoplastic resin powder to the substrate. The elastomers used in the present invention must resist degradation or attack by the particular polymeric release agent having functional groups which is used to promote release of molten plastic resin powder or toner from the fuser member. The preferred elastomers are poly(vinylidenefluoride-hexafluoropropylene-tetrafluoroethylene) wherein the vinylidenefluoride is present in amount less than 40 mole percent. By restricting the vinylidenefluoride content, the terpolymers and tetrapolymers have a relatively high fluorine content thereby providing fewer sites available to dehydrofluorination, the formation of double bonds leading to subsequent surface hardening and an increase in the surface energy of the fusing layer. Typically, the commercially available materials are peroxide curable and therefore have a cure site monomer susceptible to free radical attack introduced to enhance the curability with aliphatic perioxide systems. Typical monomers include bromo trifluoroethylene, 1 bromo 2-2-difluoroethylene, 3-bromo tetrafluoro 1 propene, 4-bromo 1-1-3 trifluorobutene and 4 bromo 3-3-4-4 tetrafluoro 1 butene. Commercially available fluoroelastomers having relatively low quantities of vinylidenefluoride include Viton GF available from E. I. DuPont deNemours, Inc.. The Viton GF has 35 mole percent of vinylidene fluoride and 34 percent hexafluoropropylene and 29 mole percent tetrafluoroethylene with, 2 percent cure site monomer. Viton GF is generally cured with a conventional aliphatic peroxide curing agent. However, according to the present invention, it is cured by the nucleophilic curing system in the presence of relatively low amounts of inorganic base materials as will be discussed hereinafter.

It is critical that the metal oxide dispersed in the elastomer upon the fuser member surface be capable of interacting with the functional groups of the polymeric release agent to form a thermally stable film which releases thermoplastic resin toner and prevents the thermoplastic resin toner from contacting the elastomer material itself. It is also important that the metal oxide be substantially unreactive with the elastomer. By being substantially unreactive with the elastomer, it is intended to define the absence of significant interaction between the metal oxide and the elastomer wherein any substantial dehydroflourination of the vinylidenefluoride in the polymer may take place. In addition the metal oxide softens rather than hardens the composition with time thus avoiding the undesirable hardening and consequent deterioration of copy quality, i.e. the development of glossy solid areas. Accordingly, the selection of the metal oxide is in strict contrast to the use of lead oxide according to prior art practices since the lead oxide in addition to functioning as an anchoring site for the functional groups of the polymeric release agent also is a strong base and therefore acts on the vinylidenefluoride to dehydrofluorinate it thereby creating double bonds for subsequent oxidation. We have found cupric oxide to be a weak base and accordingly be very effective in accordance with the practice of the present invention. The cupric oxide softens rather than hardens the elastomer with time thereby maintaining good copy quality in contrast to lead oxide which hardens the elastomer leading to poor copy quality. Any suitable amount of metal oxide may be employed providing that a sufficient amount is present to form with the functional release agent the thermally stable interfacial film between the elastomer surface and thermoplastic resin toner. Typically, the metal oxide is present in an amount of from about 5 to 30 parts by weight per 100 parts of the polymer although it is preferred to have from about 10 to 20 parts by weight of the metal oxide. The particle size of the metal oxide is important in that is should not be so small as to interfere with the curing of the polymer nor so large as to supply an insufficient number of particles dispersed throughout the elastomeric surface for good release properties. Typically, the particle size is from about 4 to 8 microns preferably 6 microns.

Any suitable polymeric release material having functional groups may be employed. Typical polymeric release agents are described in U.S. Pat. No. 4,101,686 which describes polyorganosiloxane fluids as release agents. The polyorganosiloxane fluids and other polymer fluids having functional groups interact with the metal oxide particles in the fuser member in such a manner as to form an interfacial barrier at the surface of the fuser member while leaving an unreacted low surface energy release fluid as an outer layer film. Other exemplary polymeric release agents having functional groups are described in U.S. Pat. Nos. 4,046,795, 4,029,827 and 4,011,362. The polymeric release agent having functional groups thereon may be found as a liquid or solid at room temperature but it is a fluid at operating temperatures. In preferred embodiments, the chemically reactive groups of polymeric release material are mercapto, carboxy, hydroxy, isocyanate, epoxy, and amino. The most preferred polymeric release agents having functional groups thereon used in accordance with the present invention are the mercapto functional polyorganosiloxanes described in U.S. Pat. Nos. 4,101,686 and 4,029,827.

Other adjuvents and fillers may be incorporated in the elastomer in accordance with the present invention as long as they do not effect the integrity of the elastomer the interaction between the metal oxide and the polymeric release agent having functional groups or prevent the appropriate crosslinking of the elastomer. Such fillers normally encountered in the compounding of elastomers include coloring agents, reinforcing fillers, crosslinking agents, processing aids, accelerators and polymerization initiators.

The nucleophilic curing system with the bisphenol crosslinking agent and organophosphonium salt accelerator is described in U.S. Pat. No. 4,272,179. However, according to the present invention the nucleophilic curing agent (crosslinking agent and accelerator) is soluble in a solvent solution of the polymer and is used in the presence of less than 4 parts by weight of inorganic base per 100 parts by weight of polymer. Normally, the terpolymers and tetrapolymers of vinylidenefluoride hexafluoropropylene and tetrafluoroethylene are peroxide cured. However, as previously discussed the preferred fabricating procedure for a fuser member is to spray a solvent solution of the polymer onto a substrate thereby rendering peroxide curing in air difficult since the peroxide preferentially reacts with oxygen in the air rather than curing the polymer. The preferred alternative curing system is a nucleophilic curing system such as a bisphenol crosslinking agent and an organophosphonium salt accelerator. Typically, the curing process takes place in the presence of 8 to 10 parts by weight of inorganic base per 100 parts of polymer. The inorganic base dehydrofluorinates the vinylidenefluoride in the polymer creating double bonds which act as reactive sites for crosslinking. However, the presence of excess base results in the long term degradation of the elastomers and if excess base continues to dehydrofluorinate the vinylidenefluoride generating double bonds which cause the fuser member to harden, upon subsequent oxidation causes the surface energy to increase and the release performance to degrade. Thus, it is preferred to cure the polymer at a relatively low base level to control the reactivity of the vinylidene fluoride. The typical curing agents such as Viton curative No. 30 which is about 50 percent by weight bisphenol AF and 50 percent by weight poly(vinylidenefluoride-hexafluoropropylene) and Viton curative No. 20 which is about one third triphenyl benzyl phosphonium chloride and two thirds poly(vinylidenefluoride-hexafluoropropylene) both available from E. I. DuPont de Nemours Company will not function as curing agents at low base levels. While the exact reason for this is not clear, it is believed to be at least in part due to the fact that curative No. 20 is not soluble in the solvent solution of the polymer and therefore is not in close proximity to many of the smaller number of reactive sites for crosslinking performed by the dehydrofluorination of the vinylidenefluoride. While curatives No. 20 and 30 do not function effectively at low base levels, we have surprisingly found that another Viton curative, curative No. 50 also available from E. I. DuPont de Nemours which is normally used with high base levels can be used to cure poly(vinylidenefluoride-hexafluoropropylene-tetrafluoroethylene) at less than one half its normal base level or less than about 4 parts by weight per 100 parts of polymer. Since the curative No. 50 is soluble in the solvent solution of the polymer at low base levels it is readily available at the reactive sites for crosslinking. The Viton curative No. 50 incorporates an accelerator (a quaternary phosphonium salt or salts) and a crosslinking agent, bisphenol AF into a single curative system.

The surface of the fuser member of the present invention is preferably a roll, preferably one prepared by applying either in one application or successively applying to the surface to be coated therein, a thin coating or coatings of the elastomer metal oxide filler dispersed therein. Coating is most conveniently carried out by spraying, dipping, or the like a solution or homogeneous suspension of the elastomer containing the filler. While molding, extruding and wrapping techniques are alternative means which may be used, we prefer to spray successive applications of a solvent solution of the polymer and metal oxide filler to the surface to be coated. Typical solvents that may be used for this purpose include methyl ethyl ketone, methyl isobutyl ketone and the like. When successive applications are made to the surface to be coated it is generally necessary to heat the film coated surface to a temperature sufficient to flash off any solvent contained in the film. For example, when a fuser roll is coated with an elastomer layer containing metal oxide, the elastomer having metal oxide dispersed therein is successively applied to the roll in thin coatings and between each application evaporation of the solvent in the film coated on the roll is carried out at temperatures of at least 25° C. to about 90° C. or higher so as to flash off most of the solvent contained in the film. When the desired thickness of coating is obtained, the coating is cured and thereby bonded to the roll surface.

The following Examples further define and describe fuser rolls prepared by the present invention and illustrate preferred embodiment of the present invention. Unless otherwise indicated, all parts and percentages are by weight. In the Examples, Examples VI, VII, VIII and IX are according to the present invention while Examples I through V are presented for comparison purposes to illustrate the improvements achieved according to the present invention.

EXAMPLE I

Fuser rolls were prepared using cylindrical aluminum coated copper base members or cores 3 inches in diameter and 17 inches long. The core was degreased, grit blasted, degreased and covered with an epoxy adhesive, Thixon 300/301. Thixon is trademark of Dayton Chemical Products Laboratories. An intermediate layer was formed by spraying onto the core a solvent solution/dispersion of 100 parts by weight of Viton E60C, 30 parts of carbon black, 15 parts magnesium oxide in 50/50 by weight methyl ethyl ketone and methyl isobutyl ketone. Viton E60C is a copolymer of 77 mole percent vinylideneflouride and 23 mole percent hexafluoropropylene plus sufficient Curative, 20 and 30. The elastomer coated core was hot air oven cured at 77° C. for one hour followed by one hour at 177° C. after which the surface was sanded to provide a nominal thickness of 5 mils. The fusing layer was prepared from a solvent solution/dispersion containing 100 parts by weight Viton E45, a copolymer of 77 mole percent vinylidenefluoride and 23 mole percent hexafluorpropylene, and 15 parts by weight lead oxide, 1.4 parts Curative No. 20, and 2.8 parts Curative No. 30, in a mixture of methyl ethyl ketone and methyl isobutyl ketone and was sprayed upon the multi-coated copper roll to a thickness of 3 to 5 mils. The fluoroelastomer was oven cured at 75° C. for 1 hour, followed by 175° C. for one hour, 230° C. for sixteen hours and followed by cooling and sanding. The fuser roll was used in Xerox 9500 duplicators and tested in a fusing system wherein a mercapto functional polyalkylsiloxane release agent is applied at an average rate of 8 microliters per 8-½×11 inch copy. The toner did not contain DDAMS. More than 100,000 rolls were used in fusing toner images on copy sheets experiencing an average life of about 1 million copies with failure being due to a variety of reasons including physical damage, release failure and hardening of the roll producing glossy copies.

EXAMPLE II

The procedure of Example I was repeated except that the mercapto functional release agent was applied at a rate of about 3 to 4 microliters per 8-½×11 inch copy or about one half the amount in Example I. Seven rolls were tested with stripping failure being experienced in each case before the 200,000th copy. Stripping failure was determined by the inability to strip seriatim from the roll 100 copies where the image was a ½ inch wide solid lead edge at a reflection density of 1.3 to 1.4.

EXAMPLES III and IV

The procedure of Example II was repeated for two rolls where the lead oxide in the fuser roll was replaced by 15 parts and 45 parts respectively Examples III and IV by weight of cupric oxide. In addition 1 part calcium hydroxide and 2 parts magnesium oxide were added to the Viton prior to solvent solution/dispersion. Both rolls were tested with stripping failure as defined in Example II being experienced at about 500,000 copies for both rolls.

EXAMPLE V

The procedure of Example III was repeated except that the toner contained 1 percent by weight DDAMS. A test was run in a Xerox 9500 modified for reversal development and continued for 250,000 copies each copy having a one inch image band covering 90 percent of the paper in the band area at a reflection density of 1.0. At the start of the test the initial surface roughness as measured by a Federal Surfanalyzer 1200 was 20 micro inches. After 250,000 copies the surface roughness was 110 micro inches. This drastic increase in surface roughness indicates that the elastomer has been reacted with the DDAMS and the surface layer has been eroded from the surface irregularly resulting in irregular fusing performance and copy quality defects, gloss and mottling.

EXAMPLE VI

The procedure of Example III is repeated except the Viton E45 was replaced by Viton GF a polymer of 35 mole percent vinylidene fluoride, 34 mole percent hexafluoropropylene, 29 mole percent tetrafluoroetheylene and 2 mole percent of a copolymerized cure site monomer. Curatives 20 and 30 were replaced by 5 parts Viton curative 50 and only 2 parts by weight magnesium oxide, Maglite D available from C. P. Hall, Chicago, Ill. and 1 part calcium hydroxide per 100 parts polymer were used. The solvent solution/dispersion was sprayed upon the multi-coated copper roll to a thickness of about 3-5 mils and the coated fuser member was cured by step wise heating in air at 95° C. for two hours, followed by 150° C. for 2 hours, 175° C. for 2 hours, 205° C. for 2 hours and 230° C. for 16 hours. The cured fuser roll was tested in a Xerox 9500 by fusing toner images. Stripping failure as defined in Example II for 2 rolls was not experienced until at least 1 million copies had been satisfactorily fused and stripped.

EXAMPLE VII

The procedure of Example VI was repeated except that the toner contained 1 percent by weight DDAMS. The same test as in Example V was run in a modified Xerox 9500 as in Example V for 250,000 copies. The surface roughness changed from 20 micro inches initially to 40 micro inches after 250,000 copies however there were no copy quality defects noted.

EXAMPLE VIII

The procedure of Example VI was repeated except that the toner contained 0.5 percent DDAMS. Fifty rolls were tested in a machine configuration having a fuser assembly similar to the Xerox 9500 machine Roll failure was generally due to interlayer debonding with no stripping failure after 400,000 to 800,000 copies has been made. There was no copy quality degradation.

EXAMPLE IX

The procedure of Example VIII was repeated except that the intermediate layer was formed by spraying a solvent (methylisobutyl ketone) solution/dispersion of 100 parts of Viton GF, 30 parts of carbon black (Thermax N880 available from R. T. Vanderbilt Company, Norwalk, Conn.), 15 parts of magnesium oxide, (Maglite Y available from C. P. Hall) and 5 parts of DuPont Curative No. 50 onto a cylindrical aluminum core that was degreased grit blasted, degreased and coated with Thixon 300/301. It was warm air step cured at 38° C. for 2 hours, followed by 77° C. for 4 hours, and 177° C. for 2 hours followed by sanding to a final thickness of about 5 mils. Thereafter the fuser layer was applied in accordance with Example VI. Two rolls were run in the machine configuration of Example VIII, both of which achieved 1 million copy life without interlayer debond failure or stripping failure.

Thus according to the present invention a new and improved fuser member and fuser system have been provided. In particular a fuser system with a fuser member having a very long life at reduced levels of functional oil and one which is resistant to attack by DDAMS has been provided. This is achieved by controlling the vinylidenefluoride content of the poly(vinylidenefluoride-hexafluoropropylene-tetrafluoroethylene) so as to provide a balance between a polymer which is as completely fluorinated as possible but still can be adequately crosslinked. In addition, by selecting a metal oxide filler, and providing it in an amount sufficient to interact with the polymeric release agent having functional groups to provide an interfacial barrier layer between the fusing surface and the substrate and one which is substantially unreactive with the elastomer subsequent hardening and an increase in surface energy and decrease in release properties is avoided. Furthermore, and surprisingly, by curing the poly(vinylidenefluoride hexafluoropropylene tetrafluoroethylene) at relatively low base levels with a nucleophilic curing agent soluble in a solvent solution of the polymer the amount of inorganic base provided is sufficient to generate active sites for crosslinking but not sufficient for subsequent dehydrofluorination of the vinylidenefluoride to generate additional active sites which will result in hardening of the fusing member and on subsequent oxidation increase the surface energy and cause the degradation of release properties.

All the patents referred to herein are hereby specifically, and totally incorporated by reference in their entirety in the instant specification.

While the invention has been described in detail with reference to specific and preferred embodiments, it will be appreciated that various modifications and variations will be apparent to the artisan. For example, while the invention has been illustrated with reference to a fuser roll, it will be understood that it has equal application to other fuser members such as flat or curved plate members in pressure contact with the roll. All such modifications and embodiments as may readily occur to one skilled in the art are intended to be within the scope of the appended claims.

We claim:

1. A fuser member for fusing thermoplastic resin toner images to a substrate in a fuser system of the type wherein a polymeric release agent having functional groups is applied to the surface of the fuser member, the fuser member comprising a base member and an elastomer fusing surface comprising poly(vinylidenefluoride-hexafluoropropylene-tetrafluoroethylene) where the vinylidenefluoride is present in an amount less than 40 mole percent, a metal oxide present in said fusing surface in an amount sufficient to interact with a polymeric release agent having functional groups to provide an interfacial barrier layer between said fusing surface and toner and being substantially unreactive with said elastomer, said elastomer having been cured from a solvent solution thereof with a nucleophilic curing agent soluble in said solution and in the presence of less than 4 parts by weight of inorganic base per 100 parts of polymer, said inorganic base being effective to at least partially dehydrofluorinate the vinylidenefluoride.

2. The fuser member of claim 1 wherein the elastomer contains a copolymerized cure site monomer.

3. The fuser member of claim 1 wherein the nucleophilic curing agent is a bisphenol crosslinking agent.

4. The fuser member of claim 3 wherein the nucleophilic curing agent further comprises an organophosphonium salt accelerater.

5. The fuser member of claim 1 wherein the metal oxide is cupric oxide which is present in an amount of from about 5 to 30 parts by weight per 100 parts by weight of polymer.

6. The fuser member of claim 5 wherein the cupric oxide particles have a diameter of from about 4 to 8 microns.

7. The fuser member of claim 1 wherein the base member is cylindrical and said elastomer fusing surface is a cylindrical outer layer on said base member forming a roll, said outer layer having been formed by spraying said solvent solution.

8. The fuser member of claim 7 further including at least one elastomeric layer between said base member and said outer layer.

9. The fuser member of claim 8 wherein said at least one elastomer layer is poly(vinylidenefluoride-hexafluoropropylene-tetrafluoroethylene) where the vinylidenefluoride is present in an amount less than 40 mole percent.

* * * * *